(No Model.) 2 Sheets—Sheet 1.

H. R. COLLINS.
VEHICLE HUB.

No. 594,605. Patented Nov. 30, 1897.

WITNESSES
Edw. D. Duvall Jr.
Chas. E. Riordon

INVENTOR
Harry R. Collins
By Julian C. Dowell
His Attorney.

(No Model.) 2 Sheets—Sheet 2.

H. R. COLLINS.
VEHICLE HUB.

No. 594,605. Patented Nov. 30, 1897.

WITNESSES
Edw. O. Dowell Jr.
Chas. E. Riordan

INVENTOR
Harry R. Collins
By Julian O. Dowell
His Attorney.

UNITED STATES PATENT OFFICE.

HARRY R. COLLINS, OF SOUTH BETHLEHEM, PENNSYLVANIA.

VEHICLE-HUB.

SPECIFICATION forming part of Letters Patent No. 594,605, dated November 30, 1897.

Application filed July 15, 1897. Serial No. 644,685. (No model.)

*To all whom it may concern:*

Be it known that I, HARRY R. COLLINS, a citizen of the United States, residing at South Bethlehem, in the county of Northampton and State of Pennsylvania, have invented certain new and useful Improvements in Hubs; and I do hereby declare the following to be a full, clear, and exact description of the invention, such as will enable others skilled in the art to which it appertains to make and use the same.

This invention is an improvement in pneumatic hubs for vehicle-wheels, and is particularly designed for wheels for horseless vehicles.

The primary object of this invention is to lessen the cost and simplify the construction of this class of hubs.

Another object of my invention is to so construct the parts that the spoke-ring will be driven by direct connection from the sleeve independently of the saddle, so that the radial displacement of the sleeve and saddle in relation to the spoke-ring, due to the flattening or compression of the pneumatic tube, will not cause any creeping or oscillation of the pneumatic tube upon the saddle, and the constant slight slipping of portions of the spoke-ring relative to the sleeve and saddle due to such flattening of the tube will be obviated or compensated for by reason of the capability of the saddle to rotate or turn freely upon the sleeve, thus permitting the saddle to shift or oscillate with the tube upon the sleeve without any relative movement or friction between the tube and saddle.

My invention will be hereinafter first more particularly described with reference to the accompanying drawings, which form a part of this specification, and then pointed out in the claims at the end of the description.

Figure 1:
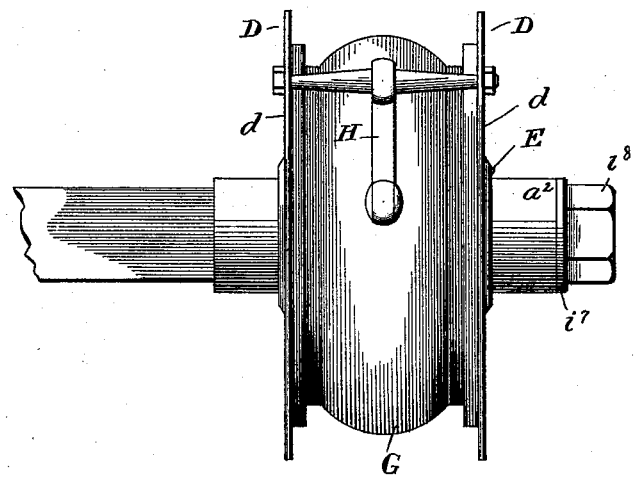
Figures 2, 3, 4:
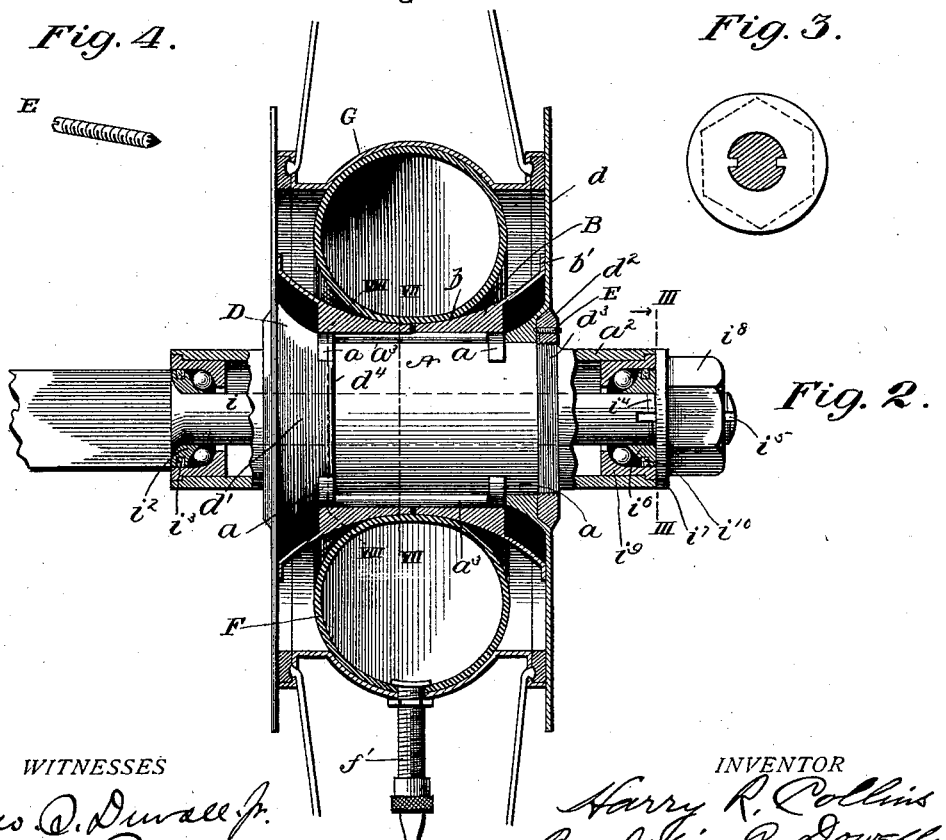
Figure 5:
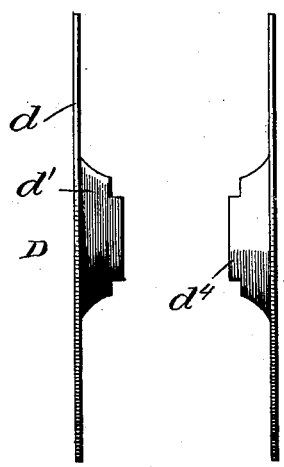
Figure 6:
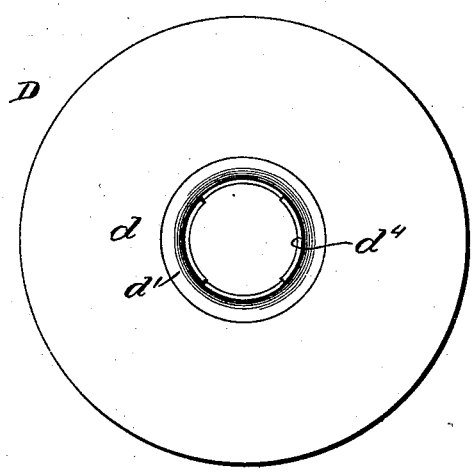
Figures 7, 8:
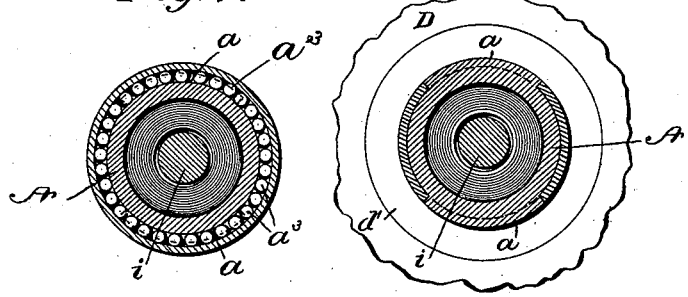
Figure 9:
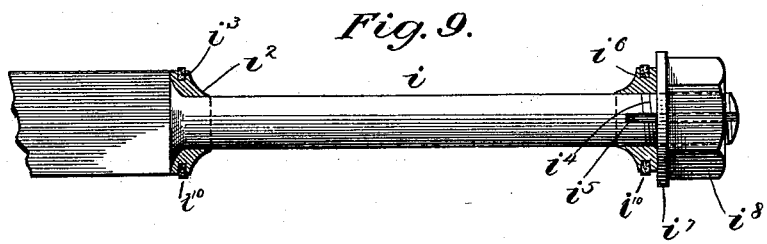

In the said drawings, Figure 1 is a side view of a pneumatic hub constructed in accordance with my invention. Fig. 2 is a vertical transverse section of the same, on an enlarged scale, with the axle box or sleeve partly in elevation. Fig. 3 is a detail sectional view on the line III III of Fig. 2, showing the retaining-washer in position on the axle. Fig. 4 is a detail perspective view of the set-screw for securing the retaining-collars for the disks on the axle-box. Fig. 5 is a front view of the retaining-disks for the saddle-sections. Fig. 6 is an inside view of one of said disks. Fig. 7 is a detail cross-sectional view of the axle sleeve or box, taken on the line VII VII of Fig. 2. Fig. 8 is a detail cross-sectional view of the axle box or sleeve, taken on the line VIII VIII of Fig. 2; and Fig. 9 is an elevation of one end of the axle.

A denotes the axle box or sleeve, which is provided with opposite parallel peripheral circumferential collars $a$ near its center, between which are guided a series of antifriction-bearings $a^3$, preferably rollers, (though balls might be used,) which project slightly beyond the periphery of the collars $a$, and surrounding these rollers is the annular saddle B, on which the pneumatic tube rests. The saddle is preferably made of two similar opposite sections fitted together, as shown, and antifriction-rollers are preferably employed because they afford a wider bearing-surface and prevent oscillation of the saddle. The saddle-sections are formed with the annular seat portion $b$ and with annular vertical flanges $b'$, and they are held close together and in position on the sleeve by the vertical flanges $d$ of the retaining-disks D, which also have annular bosses $d'$, that fit the sleeve and are fastened thereto by means of the ring-nuts $d^2$, which engage screw-threaded portions $d^3$ of the sleeve, as shown in Fig. 2.

By reference to Fig. 2 it will be seen that the friction-bearings are confined between the saddle B and the sleeve and between flanges $a\ a$. The saddle, however, has no direct connection with the sleeve and is free to rotate thereon. Two retaining-disks D are employed to keep the saddle in position, one at each side thereof, the bosses of the disks fittting closely against the collars $a$ and preferably having projecting segments $d^4$ on their inner edges, which engage corresponding recesses in the collars, so as to lock the disks to the sleeve and compel them to rotate therewith. As shown, the collars $a$ are also segmental, the segments $d^4$ on the bosses of disks D fitting between the segments of the collars and the inner edges of segments $d^4$ being respectively flush with the inner faces of the interlocked collar $a$, so that when the disks D are in position the rollers $a^3$ are confined in an annular channel formed by said collars and disk projections, as shown. By removing either disk D the rollers can easily be removed or replaced. After the rollers $a^3$, saddle B, and disks D are in place the ring-nuts $d^2$ are screwed tightly against the bosses of the disks D, so that the latter will be held tightly against the collars $a$ and prevent lateral movement of the saddle-sections. The ring-nuts are locked by set-screws E, (see Fig. 4,) which are tapped through the ring-nuts, and their inner ends being formed with a rose-bit tip they embed themselves into the bosses of the disks and thereby prevent the ring-nuts working loose on the sleeve. The flanges $b'$ of the saddle-sections fit closely but easily against flanges $d$, as shown in Fig. 2, thus centering the saddle on the sleeve.

The pneumatic tube F is supported on the saddle, which is preferably of greater curvature longitudinally than the tube is in cross-section. The tube F is surrounded by the spoke-ring G, which forms part of the subject-matter of another application filed by me June 23, 1897, Serial No. 641,959, and the tube is fastened to the spoke-ring by the valve connection $f'$. The spoke-ring G, with the interposed packing-ring $g$, is also more fully set forth in the above-mentioned application, as is also the driving connection H between the spoke-ring G and disks D.

From the foregoing description it will be observed that in the present invention the spoke-ring is connected to the disks and the latter to the sleeve, so that the spoke-ring is driven directly from the sleeve and not from the saddle, which latter is capable of rotation on the sleeve independently thereof. The pneumatic tube is fast to and rotates with the spoke-ring, and it also binds the saddle firmly, so as not to slip thereon, but causes the saddle to move with it. This construction entirely obviates or prevents the frictional movement of the tube on the saddle, which is produced in those constructions where the spoke-ring is connected to the saddle by reason of the eccentric play of the spoke-ring in relation to the saddle due to the flattening or compression of the tube by the load.

The axle or spindle $l$ shown in connection with this sleeve is preferably of the following construction: On the spindle $i$ is pressed one of the cones $i^2$, which is made to bear against the shoulder $i^3$ at the junction of the spindle and axle. The other end of the spindle is provided with a screw-thread $i^4$ and with diametrically opposite longitudinal slots $i^5$. A cone $i^6$ is screwed on the screw-threaded end of the axle or spindle, and after it is properly adjusted a clamping-washer $i^7$ is slipped on the end of the spindle, and inwardly-projecting lugs on said washer engaging the longitudinal slots $i^5$. A locking-nut $i^8$ is then screwed tightly against the washer. These cones $i^2$ $i^6$ are used in connection with the ball-races $i^9$, which are fitted in the ends of sleeve A in the manner set forth in my above-mentioned application, and the dust-proof washers $i^{10}$ are also more particularly set forth in said application.

The several parts composing the hub are preferably made from specially-tempered steel and are turned to the required shape and thickness on a lathe.

Having thus fully described my invention, what I claim as new, and desire to secure by Letters Patent of the United States, is—

1. The combination with a sleeve or axle, a saddle rotatably mounted thereon, and antifriction-bearings interposed between the sleeve and saddle, with means for confining the saddle upon the sleeve, substantially as described.

2. In a pneumatic hub, the combination of a sleeve or axle, a saddle rotatably mounted thereon, and antifriction-bearings interposed between the sleeve and saddle; with the pneumatic tube, the spoke-ring, and means for confining the saddle and spoke-ring upon the sleeve, substantially as described.

3. The combination of the sleeve or axle, a saddle rotatably mounted thereupon, the disks rotating with the sleeve and confining the saddle in place thereupon, and means for securing said disks upon the sleeve, substantially as described.

4. The combination of the sleeve or axle, a saddle rotatably mounted thereupon, antifriction-rollers interposed between the saddle and sleeve, and means for preventing lateral displacement of the saddle, substantially as described.

5. The combination of the sleeve or axle, a saddle rotatably mounted thereupon, the removable disks for confining the saddle in place upon the sleeve, and means for locking said disks to the sleeve, substantially as described.

6. The combination of the sleeve or axle, a saddle rotatably mounted thereon, antifriction-bearings interposed between the saddle and sleeve, removable disks on the sleeve for preventing lateral displacement of the saddle, and means for locking said disks to the sleeve, substantially as described.

7. The combination of the sleeve or axle, a saddle rotatably mounted thereupon, removable disks for retaining the saddle in place upon the sleeve, means for causing the disks to rotate with the sleeve, and means for securing the disks upon the sleeve, substantially as described.

8. The combination of the sleeve or axle, a saddle rotatably mounted thereon, antifriction-bearings interposed between the saddle and sleeve; opposite disks confining the saddle on the sleeve and locked to the saddle so as to rotate therewith, and the ring-nuts for securing the disks to the sleeve, substantially as described.

9. The combination of the sleeve having segmental collars, a saddle rotatably supported on the sleeve intermediate said collars, opposite disks confining said saddle in place upon the sleeve, said disks having segmental projections interlocking with said collars so as to compel the disks to rotate with the sleeve, substantially as described.

10. The combination of the sleeve having segmental collars, a saddle rotatably mounted on the sleeve, antifriction-bearings interposed between the sleeve and saddle and lying between the said collars; with removable disks fitted on the sleeve having segments interlocking with said collars; and means for confining the disks on the sleeve, substantially as described.

11. The combination of the sleeve with segmental collars, a saddle on said sleeve, disks on said sleeve confining the saddle in place and having segments interlocking with said collars so as to cause the disks to rotate with the sleeve, a pneumatic tube surrounding said saddle, a spoke-ring surrounding said tube, said spoke-ring being also confined between said disks, substantially as described.

12. The combination of the sleeve, the saddle rotatably mounted on said sleeve, the pneumatic tube surrounding said saddle, and the spoke-ring surrounding said tube; with opposite disks fitted on the sleeve and retaining the saddle and spoke-ring in position, and means for locking the said disks to the sleeve so as to cause them to rotate therewith, substantially as described.

13. In a vehicle-wheel, the combination with the axle box or sleeve, the saddle-sections supported by said sleeve, the interposed rollers between the sleeve and saddle-sections, the disks for preventing lateral movement of the saddle-sections, the pneumatic tube carried by said sections, and the spoke-ring confining said tube, substantially as described.

14. In a vehicle-wheel, the combination with the axle box, or sleeve, having segmental collars or shoulders, the saddle-sections carried by said sleeve, the interposed rollers between said sleeve and saddle-sections located between and confined by the segmental collars, the disks on said sleeve in engagement with said collars and preventing lateral movement of the saddle-sections, the pneumatic tube carried by said saddle-sections, and the spoke-ring for confining the pneumatic tube on said saddle-sections, substantially as described.

15. In a vehicle-wheel, the combination of the sleeve or axle, the segmental shoulders or collars diametrically arranged on said sleeve, the saddle-sections carried on said sleeve, the disk carried by said sleeve for preventing lateral movement of the saddle-sections, said disks being formed with projections which fit between the segmental shoulders or collars whereby the disks are turned with the sleeve, the pneumatic tube carried by the saddle-sections, and the spoke-ring for confining said tube on the saddle-sections, substantially as described.

16. In a vehicle-wheel, the combination of the sleeve, the saddle-sections carried on said sleeve, the disks for preventing lateral movement of the saddle-sections mounted on the sleeve so as to turn therewith, the clamping-rings fitting on said sleeve and bearing against said disks, and a set-screw provided in each of said rings, for holding them against movement, said set-screws having each a rose-bit tip which will embed in the disks, substantially as described.

17. In a pneumatic hub, the combination with the axle box or sleeve, the saddle-sections for supporting the pneumatic tube carried on said sleeve, the pneumatic tube, means for confining it on the saddle, and the antifriction-rollers interposed between the sleeve and the saddle-sections, substantially as described.

18. In a hub for vehicle-wheels, the combination of the sleeve provided with the segmental shoulders or collars, the saddle-sections carried on said hub, antifriction-rollers interposed between said sleeve and saddle-sections and confined by said collars, disks carried by said sleeve for preventing lateral movement of said saddle-sections and in locked engagement with said segmental collars or shoulders, a pneumatic tube on said sections, a spoke-ring on said tube, and a suitable connection between said spoke-ring and disks, substantially as described.

19. In a wheel, the combination with the hub and spoke-ring radially movable relatively to each other, of an interposed cushion, and roller-bearings between said cushion and the hub.

In testimony whereof I affix my signature in presence of two witnesses.

HARRY R. COLLINS.

Witnesses:
CHARLES E. RIORDON,
S. B. ARMAT.